US012739634B2

(12) United States Patent
Liu

(10) Patent No.: US 12,739,634 B2
(45) Date of Patent: Sep. 15, 2026

(54) ENABLING CELLULAR NETWORK ACCESS VIA DEVICE IDENTIFIER COMPOSITION ENGINE (DICE)

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 25 days.

(21) Appl. No.: 17/203,638

(22) Filed: Mar. 16, 2021

(65) Prior Publication Data

US 2022/0303769 A1 Sep. 22, 2022

(51) Int. Cl.

*H04L 9/32* (2006.01)
*H04L 9/06* (2006.01)
*H04W 12/041* (2021.01)
*H04W 12/069* (2021.01)
*H04W 84/04* (2009.01)

(52) U.S. Cl.

CPC ......... *H04W 12/069* (2021.01); *H04L 9/0643* (2013.01); *H04L 9/3268* (2013.01); *H04W 12/041* (2021.01); *H04L 2209/80* (2013.01); *H04W 84/042* (2013.01)

(58) Field of Classification Search

CPC ............. H04W 12/069; H04W 12/041; H04W 84/042; H04L 9/0643; H04L 9/3268; H04L 2209/80

See application file for complete search history.

(56) References Cited

U.S. PATENT DOCUMENTS 9,516,620 B1 * 12/2016 Upp .................... H04L 65/1016
10,645,573 B2 5/2020 Fleischman et al.
2010/0266128 A1 * 10/2010 Asokan ................ H04W 12/04 380/278
2011/0256906 A1 10/2011 Kumar
2016/0007190 A1 * 1/2016 Wane .................. H04W 84/042
2016/0087972 A1 * 3/2016 Ahmavaara ......... H04W 12/043 726/10
2017/0257341 A1 9/2017 Arsenault et al.
2017/0295168 A1 * 10/2017 Wan .................... H04L 63/0876
2019/0236582 A1 8/2019 Colegate et al.
2020/0151335 A1 * 5/2020 Ayoub ................ H04L 63/0435
2020/0313866 A1 * 10/2020 Mondello ............. H04W 12/43
2020/0313909 A1 * 10/2020 Mondello ............. H04L 9/0869
2020/0351653 A1 * 11/2020 Khan .................... H04W 12/35

(Continued)

OTHER PUBLICATIONS

International Search Report and Written Opinion, PCT/US2022/018707, mailed on Jun. 9, 2022.

*Primary Examiner* — Khoi V Le
(74) *Attorney, Agent, or Firm* — Greenberg Traurig

(57) ABSTRACT

The disclosed embodiments provide cryptographically secure International Mobile Equipment Identity (IMEI) numbers via a Device Composition Identifier Engine (DICE). In one embodiment, a method is disclosed comprising receiving, at a computing device, an IMEI number from a cellular network; generating, by the computing device, a digital certificate using the IMEI number, the digital certificate signed using a private key generated by a manufacturer of the computing device; and transmitting, by the computing device, the digital certificate to the cellular network when authenticating to the cellular network.

17 Claims, 5 Drawing Sheets

(56) References Cited

U.S. PATENT DOCUMENTS

2020/0396088 A1* 12/2020 Master ................ H04W 12/043
2021/0044575 A1 2/2021 Kong et al.
2021/0120387 A1* 4/2021 Roy ........................ H04W 4/50
2022/0014912 A1* 1/2022 Wilson ............... G06Q 20/3574

* cited by examiner

ENABLING CELLULAR NETWORK ACCESS VIA DEVICE IDENTIFIER COMPOSITION ENGINE (DICE)

TECHNICAL FIELD

At least some embodiments disclosed herein relate to cellular networks in general, and more particularly, but not limited to utilizing a Device Identifier Composition Engine (DICE) to validate terminal devices on the network.

BACKGROUND

International Mobile Equipment Identity (IMEI) numbers are utilized in cellular systems to identify user equipment (UE) such as mobile phones or tablets. An IMEI is a unique value associated with a physical device. A mobile network operator (MNO) can use an IMEI to manage a fleet of valid devices. For example, MNOs can track stolen devices using an IMEI or can allow/disallow network access to devices based on an IMEI.

BRIEF DESCRIPTION OF THE DRAWINGS

The following examples in the figures of the accompanying drawings illustrate the disclosed embodiments without limitation. Like references indicate similar elements.

DETAILED DESCRIPTION

The disclosed embodiments provide a computing device implementing a Device Identify Composition Engine (DICE) which can generate an asymmetric key pair based on, for example, a physically unclonable function (PUF). The generated key pair is hardware and firmware unique. A trusted external certificate authority (CA) or embedded CA (ECA) can then sign the generated public key (e.g., using X.509) with its subject name as the name of the owner (e.g., the common name is owner name). This comprises a root of trust of Layer 0 in a DICE architecture. The disclosed embodiments further describe a server run by a mobile network operator (MNO). Through this server, the MNO can generate and transmit virtual IMEIs to UEs.

The UEs choose a Trusted Computing Base (TCB) and combine the TCB with the virtual IMEI to generate the TCB Component Identity (TCI) and a corresponding TCI asymmetric key pair. The UE then sign (e.g., via X.509) the TCI public key with the generated private key and uses the certificate's subject name as IMEI number (e.g., the common name as IMEI number). In the illustrated embodiments, this binds the IMEI to the device and therefore the owner. Any communication using the IMEI will then be associated with the owner by the MNO. In the disclosed embodiments, there is no need for the device to have a subscriber identity module (SIM) card and the access is secure.

Figure 1:
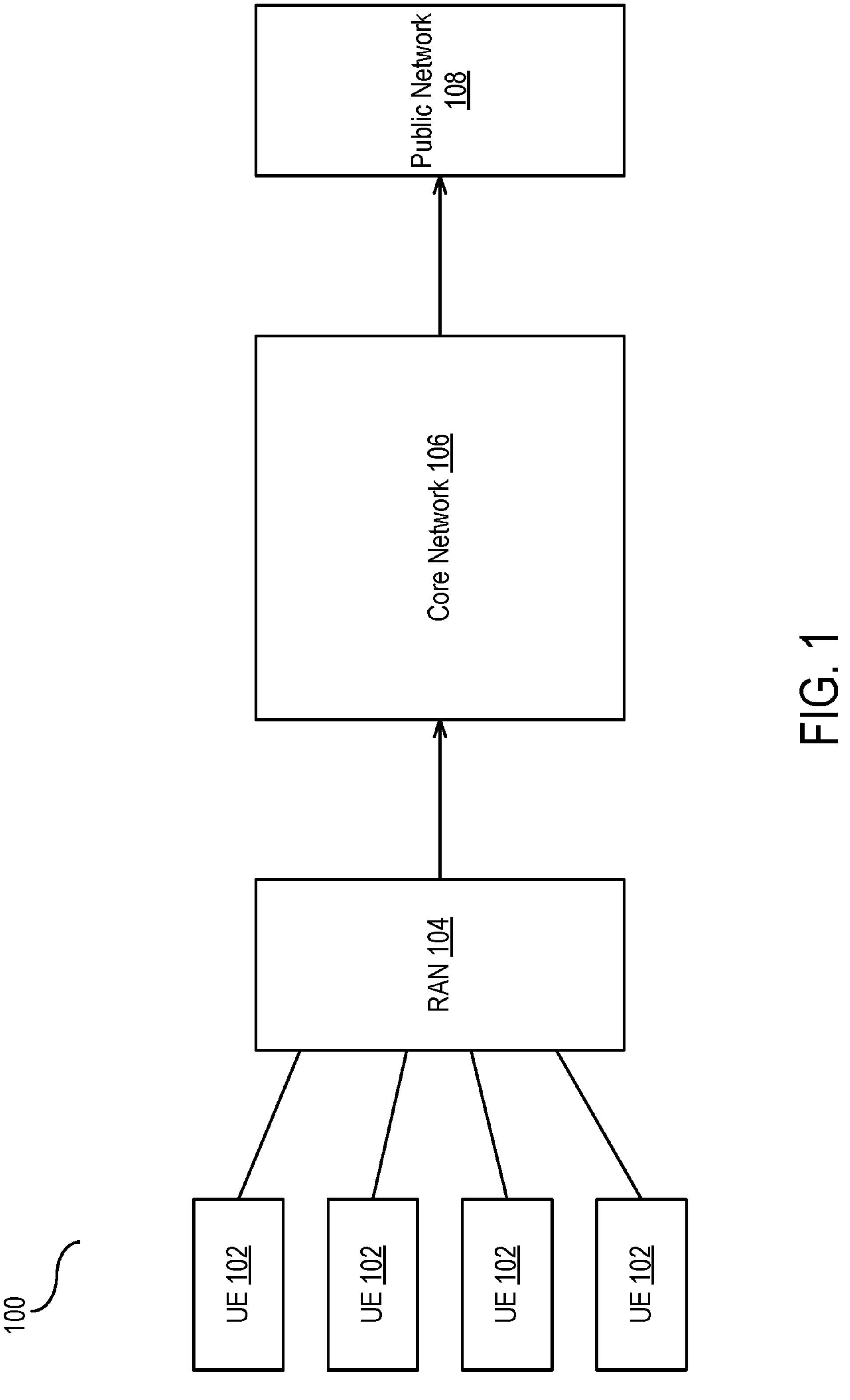
FIG. 1 is a block diagram illustrating a cellular network (100) according to the disclosed embodiments.

FIG. 1 is a block diagram illustrating a cellular network (100) according to the disclosed embodiments.

In the illustrated embodiment, one or more UE (102) are communicatively coupled to a core network (106) via a radio access network (RAN) (104). A core network (106) further enables communication with public networks (108).

In the illustrated embodiments, the UE (102) may comprise mobile phones, tablet devices, laptop or desktop devices, Internet-of-Things (IoT) devices, or generally any computing devices equipped with a cellular transceiver. The UE (102) may comprise 3G, 4G, 5G, or any other generation of cellular telecommunications standard. While certain examples herein are described with reference to 4G or 5G, the disclosed embodiments are not limited to a specific cellular technology and are applicable to future or past cellular standards. To the extent that some features are specific to a cellular technology or generation, the following description identifies those features explicitly.

In the illustrated embodiment, RAN (104) comprises a network of base station (BS) or access point (AP) devices. Examples of such devices include eNodeB devices in a 4G network or gNodeB devices in a 5G network. The BS or AP devices may communicate with one another to facilitate handover of UE (102) during operation as well as route control and user data traffic to the core network (106).

The core network (106) comprises a centralized network managed by an MNO. The core network (106) performs all traffic routing and management of UE (102). The core network (106) may comprise a mobility manager (e.g., a 4G MME or 5G AMF) that manages UE (102) connections. The core network (106) may also include various gateway devices (e.g., a serving gateway and packet data network gateway in a 4G network) that process user data traffic and allow for access to public data network (108) over, for example, the public Internet.

In some embodiments, the core network (106) further includes a virtual IMEI server. The virtual IMEI server is capable of generating unique NEI numbers on-demand. IMEI numbers either come in a 17 digit or 15 digit sequences of numbers. In one embodiment, the IMEI format utilized may be of the form AA-BBBBBB-CCCCCC-D, where AA represents the Reporting Body Identifier, indicating the GSMA approved group that allocated the TAC (Type Allocation Code), BBBBBBB represents the remainder of the TAC, CCCCCC represents a device serial number unique to the manufacturer and D represents a check digit. Certainly, other NEI formats may be used. However, in general, the IMEI is capable of being generated by an MNO. To ensure uniqueness, the MNO may maintain a list of all generated IMEIs and confirm uniqueness before finalizing an IMEI value. In one embodiment, the MNO may also remove generated IMEIs from its list when it confirms that an IMEI has been released by a UE (102).

In the illustrated embodiment, the core network (106) generates IMEI numbers in response to requests from UE (102). As will be discussed, the core network (106) returns the IMEI numbers to the UE (102) and the UE (102) securely generates a device identity certificate based on the IMEI. The core network (106) may then receive a certificate from a given UE (102) that includes the IMEI associated with the UE (102). Since certificate is securely generated by the UE (102), the core network can utilize the certificate as a proof of device identity and perform various functions based on this confirmation (e.g., blacklisting, deactivation, etc.) not limited by the disclosed embodiments.

Although the following description emphasized the use of IMEI numbers, other types of identifiers may be used including, but not limited to International Mobile Subscriber Identity (IMSI) numbers, Integrated Circuit Card Identifier (ICCID) numbers, etc. Indeed, any unique identifier may be used in the disclosed embodiments.

Figure 2:
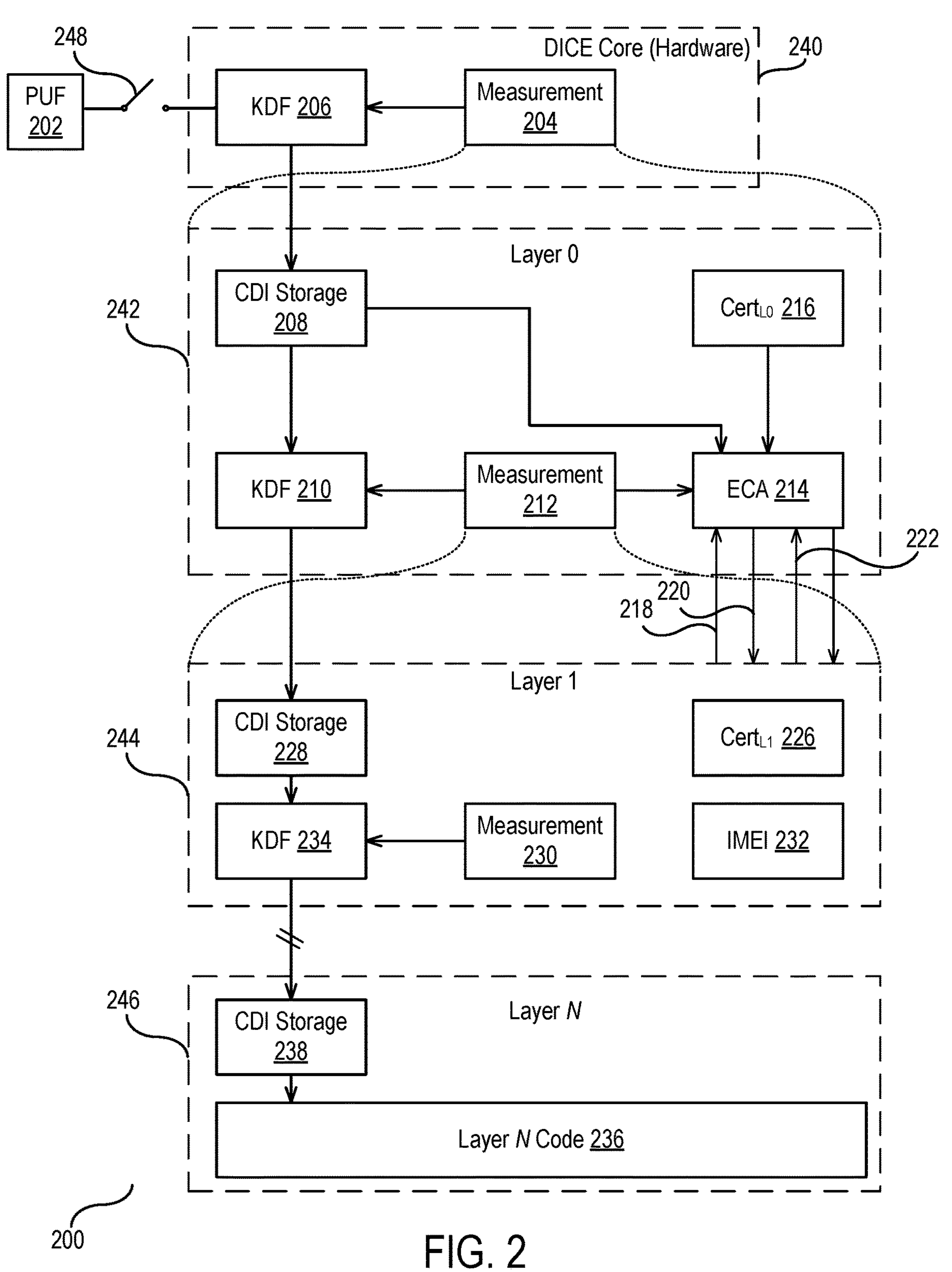
FIG. 2 is a logical block diagram of user equipment device cryptosystem according to some embodiments of the disclosure.

FIG. 2 is a logical block diagram of user equipment device cryptosystem according to some embodiments of the disclosure.

In the illustrated embodiment, the cryptosystem (200) is divided into a plurality of layers (240, 242, 244, 246). In the illustrated embodiment, the layers are arranged in a hierarchal manner and may conform to a Device Identity Composition Engine (DICE) architecture. As illustrated, the cryptosystem (200) includes a root layer (240). In one embodiment, the root layer (240) may comprise a processor boot read-only memory (ROM), a dynamic Root of Trust for Measurement (RTM) in a hypervisor system, a trusted execution environment (TEE) in a secure enclave, or a similar hardware-based layer of a cryptosystem. The root layer (240) includes a key derivation function (KDF) (206) and measurement code (204). In the illustrated embodiment, the root layer (240) reads a unique device secret (UDS) from a physically unclonable function (PUF) (202). In the illustrated embodiment, the PUF (202) may comprise a physical hardware circuit that exploits inherent randomness introduced during manufacturing to give a physical entity a unique 'fingerprint' or trust anchor. In the illustrated embodiment, the PUF (202) produces a consistent and repeatable value during power-on. In the illustrated embodiment, the PUF (202) is communicatively coupled to KDF (206) via a hardware latch (248). In the illustrated embodiment, the KDF (206) and PUF (202) are only communicatively coupled briefly during the initial phases of power-on. Thus, the KDF (206) will only briefly have access to the PUF (202) during this power-on while the latch (248) is closed. After this initial closing, the latch (248) remains open until the next power cycle, securing the PUF (202). Upon receiving the UDS from PUF (202), the KDF (206) generates a derived key for the next layer, layer 0 (242). As used herein, a derived key is referred to alternatively as a component device identifier (CDI). In the illustrated embodiment, the KDF (206) generates the CDI using a one-way hash function (OHF) such as a Hash-Based Message Authentication Code (HMAC) function. In one embodiment, the OHF uses the UDS and a measurement value as inputs. In one embodiment, the measurement code (204) generates the measurement value for use by the KDF (206). In one embodiment, the measurement values are computed based on the contents of the Layer 0 (242) code. Other values may be used, however generally the measurement code (204) computes a value based on properties of the Layer 0 (242) code. As an example, the measurement code (204) may compute a digest of a portion of the firmware implementing the Layer 0 (242) code. Since the Layer 0 (242) firmware is not yet loaded and executed, the measurement code (204) can load the idle firmware code from persistent storage and compute the digest of the code prior to execution. In some embodiments, the root layer (240) instantiates the next layer (Layer 0, 242) after computing the CDI value via the KDF (206).

As illustrated, the KDF (206) provides the computed CDI value ($CDI_0$) to the Layer 0 (242) code. The Layer 0 (242) code may store the CDI in a persistent storage location (208). In one embodiment, the Layer 0 (242) code may only temporarily store the CDI value and may remove the CDI value upon completing execution upon handing control to the next layer, Layer 1 (244).

As with the root layer (240), the Layer 0 (242) code includes a KDF (210) and measurement code (212). These components may function identically to KDF (206) and measurement code (204), respectively, and the details of those components are incorporated herein in their entirety. Similarly, the Layer 1 (244) code includes CDI storage (228), KDF (234), and measurement code (230). These components may also function identically to KDF (206) and measurement code (204), respectively, and the details of those components are incorporated herein in their entirety. As can be seen, each layer generates a device identity (e.g., CDI) for the subsequent layer based on its own CDI (generated by a previous layer) and a measurement of the subsequent layer. Ultimate, a final layer (246) may receive a CDI and store the CDI in CDI storage (238). The final layer (246) may not generate keys for subsequent layers, since it is the final layer and may instead include its own Layer N code (236) that may comprise, for example, a container, an enclave applet, an embedded function, etc. As illustrated, there may be an arbitrary number of layers between Layer 1 (244) and Layer N (246).

Returning to Layer 0 (242), the Layer 0 (242) code includes an embedded certificate authority (ECA) (214) function. Details of how ECA (214) operates are provided in the description of FIGS. 3 through 6, which are not repeated in detail herein. In brief, the ECA (214) can generate digital certificates for subsequent layers. As illustrated, the ECA (214) receives enrollment requests (218) from the Layer 1 (244) code and returns a CDI (220) to the Layer 1 (244) code. The Layer 1 (244) code uses the CDI to generate a certificate signing request (CSR) (222) that includes a virtual IMEI number (232) received from an MNO. The ECA (214) validates the CSR and returns a valid digital certificate (222) to the Layer 1 (244) code. In some embodiments, the ECA (214) may be configured to generate and sign the certificate without a CSR, as described further with respect to FIG. 3. As illustrated, the Layer 1 (244) code stores this certificate (226) and uses the certificate (226) for identity validation to the MNO. In some embodiments, the Layer 1 (244) code may include its own ECA functionality to respond to CSRs from Layer 2 code, and so forth.

In the illustrated embodiment, the Layer 0 (242) code includes a manufacturers certificate (216). In one embodiment, the manufacturers certificate (216) is generated and written to the Layer 0 (242) code during manufacturing. In one embodiment, the manufacturers certificate (216) acts as an initial device identity (IDevID) consistent with IEEE 802.11AR.

In some embodiments, the Layer 1 (244) code may provide the certificate (226) to upstream layers (e.g., Layer 2 246) so that the device may provide the certificate (226) to an MNO. In some embodiments, the certificate can be validated by MNO and used to associate devices (via device identifiers) with IMEI numbers.

Figure 3:
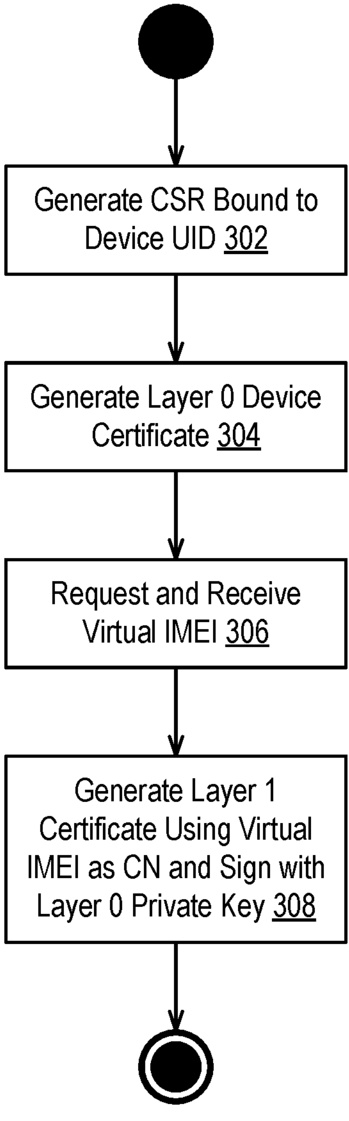
FIG. 3 is a flow diagram illustrating a method for generating a virtual IMEI certificate according to some embodiments of the disclosure.

FIG. 3 is a flow diagram illustrating a method for generating a virtual IMEI certificate according to some embodiments of the disclosure.

In the illustrated embodiment, a manufacturer manufactures computing devices used in the method. In one embodiment, the computing devices may include memory devices such as Flash storage devices. Alternatively, the computing devices may include integrated electronic devices such as cellular phones or tablet computing devices. In the following description, a memory device (e.g., a Flash-based storage device) is used as an example, however other embodiments may utilize other devices.

In block 302, the method generates a certificate signing request (CSR) for a device; this CSR binds an asymmetric key pair (public/private key) to a unique identifier (UID) of the device. Thus, the CSR can be used to prove that the UID is associated with the asymmetric key pair and can be used to verify the signature signed using the private key.

In one embodiment, each device is associated with a UID. The UID comprises a unique value assigned to the device by the manufacturer. In one embodiment, the UID may comprise any alphanumeric sequence uniquely identifying the device. In one embodiment, the CSR comprises a request formatted according to the PKCS #10 specification. In one embodiment, the CSR includes inter alia a common name (CN) field. In one embodiment, the method may comprise using the UID as the CN field value.

As part of block 302, the method may generate an asymmetric key pair comprising a public and a private key. That is, the method may comprise generating both a public key and a private key. In one embodiment, the manufacturer generates both the public key and the private key. The manufacturer may write this key pair to the device and retain a copy of the key pair in a secure storage device (e.g., an HSM). In one embodiment, the manufacturer may only permanently store the public key portion of the key pair written to the device during manufacturing. The key pair stored on the memory device, and its corresponding key(s) stored by the manufacturer, are referred to as the device key pair (or, individually as the device private key and device public key). In embodiments, where the manufacturer removes the private key from its storage repository, the manufacturer may maintain a mapping of public keys to UIDs and allow the generator of new asymmetric key pair (e.g., a customer) to upload a new public key for a given UID, thus transferring ownership of the device without requiring duplicate storage of a private key (i.e., both on the device and by the manufacturer).

Returning to the CSR, the method may utilize the device public key as the public key of the CSR. If a manufacturer generated the device key pair, the manufacturer signs the CSR using the device private key. In some embodiments, after purchasing the device, a customer may request or purchase the CSR from the manufacturer. The customer can then use the CSR to generate the device certificate.

An example of selected fields of a CSR is depicted below:

Subject: C=US, ST=CA, L=Curpertino, 0=Manufacturer, OU=Memory, CN=9ABEF838914800B0654107C7-6EB7FF4F, emailAddress=admin@example.com Here, C refers to a country code, ST refers to a state (US) code, L refers to a locality (e.g., town, city, etc.), O refers to an organization name (e.g., the manufacturer), OU refers to the organizational unit within the organization (e.g., a department), emailAddress provides a contact address, and CN stores the UID of the device associated with the CSR. A full example of a CSR is provided in Appendix 1.

After executing block 302, the method may further comprise one or more of storing the CSR at the manufacturer, writing the CSR to the device, or providing the CSR to a customer. In some embodiments, all options may be used simultaneously.

In block 304, the method generates a layer 0 device certificate. In some embodiments, this certificate is generated using the CSR from block 302. In some embodiments, the manufacturer may act as a certificate authority (CA) and generates the layer 0 device certificate. In other embodiments, a customer (i.e., purchaser of the device) may use the CSR to generate the layer 0 certificate. In some embodiments, a third-party CA may be used to generate the layer 0 certificate. In the illustrated embodiment, the device UID is used as the common name (CN) of the certificate. Since the CSR utilizes the public key instantiated by the manufacturer during manufacturing, the certificate is thus necessarily tied to the specific device represented by the device UID. An example of a certificate is provided in Appendix 2.

In one embodiment, the certificate generated in block 304 is used as the DICE Layer 0 certificate, or manufacturing certificate, CAMFGCertL0 and may be used as the device identity (e.g., an IDevID). In one embodiment, Layer 0 refers to a first mutable code layer after an immutable code layer. In one embodiment, a first mutable code layer may comprise a boot loader, hypervisor loader, enclave runtime, or runtime bootloader.

At the conclusion of block 304, a given device includes a certificate and an asymmetric key pair. The certificate and asymmetric key pair represent the layer 0 root of trust (RoT) in a DICE core implemented on the device.

In the illustrated embodiment, Layer 0 may comprise a boot layer of a device; for example, a U-Boot layer in an IoT device. A component identifier for the boot layer ($TCI_0$) may computed by hashing data representing the boot layer. In some embodiments, the data representing the boot layer may include one or more of a selected part of the boot layer which should not be changed (used as firmware mutable code (FMC)), a version number of the boot layer, a manufacturer identifier of the boot layer, a manufacturer identifier of the device, and a TCI level (e.g., L0). Further, a unique device secret (UDS) may be generated in the device using a physically unclonable function (PUF) and protected in Flash memory, thus inaccessible from outside. Using these two values (UDS and $TCI_0$), the boot layer can calculate a compound device identifier ($CDI_0$) using a one-way hash function (e.g., HMAC): HMAC (UDS, $CID_0$). A corresponding asymmetric key pair ($PK_0$, $K_0$) can then be generated using the $CDI_0$ and a well-defined key generation algorithm. Each of the foregoing steps, resulting in a $CDI_0$ value and asymmetric key pair ($PK_0$, $K_0$) may be performed by the manufacturer during manufacturing of the device.

In block 306, the method requests a virtual IMEI from a cellular network. In one embodiment, an MNO may maintain a list of IMEIs. In one embodiment, the MNO may further be capable of generating new, unique IMEIs on-demand. In the illustrated embodiment, the device may request a new IMEI if one is not present in non-volatile storage. In response, the MNO may transmit an IMEI to the device over the cellular (or other network). In one embodiment, block 306 may performed after a manufacturer sells the device to a downstream consumer. In other words, blocks 304 and 306 may be separated by a relatively longer passage of time. Further, block 306 may be re-executed repeatedly during the lifespan of the device.

In block 308, the method generates a Layer 1 certificate.

In one embodiment, the above functionality of block 308 is performed by the Layer 0 boot loader, although in some embodiments it may be performed by a later layer. In general, the layer performing block 306 implements an embedded CA (ECA) functionality. Certification using an ECA allows a layer to issue a certificate that extends trust to a higher layer (e.g., the next layer).

In one embodiment, the ECA executing block 308 may comprise a Direct Layered Certificate functionality. In this embodiment, the ECA may issue certificates according to a policy that is embedded in the ECA firmware or is securely configured. The policy describes how and when to issue layer specific certificates. The ECA generates the to-be-certified key pair and authorizes ECA certificate issuance. The ECA may securely provision the key pair to the higher layer or may allow the key to be accessed by the higher layer over a secure channel. To implement this functionality, the ECA may measure the next layer (N+1) to generate a component identifier for the next layer. The ECA then computes a compound device identifier for the next layer using its own compound device identifier (CDIN) and the component identifier ($TCI_{N+1}$) using a one-way function (e.g., HMAC) (e.g., $CDI_{N+1}$=HMAC(CDIN, $TCI_{N+1}$)). The ECA then generates an asymmetric key pair for the next layer using the generated $CDI_{N+1}$ value which represents the identity of the next layer. Using this asymmetric key pair, the ECA can then generate a digital certificate ($Cert_{N+1}$) for the next layer. Finally, the ECA provides the digital certificate, computed CDI ($CDI_{N+1}$), and generated private key to the next layer. In some embodiments, the ECA may not provide the private key and in this scenario the next layer could re-generate the private key using the value of $CDI_{N+1}$.

In an alternative embodiment, block 308 may comprise generating a certificate in response to a CSR issued by a higher layer.

Figures 4, 5, 6:
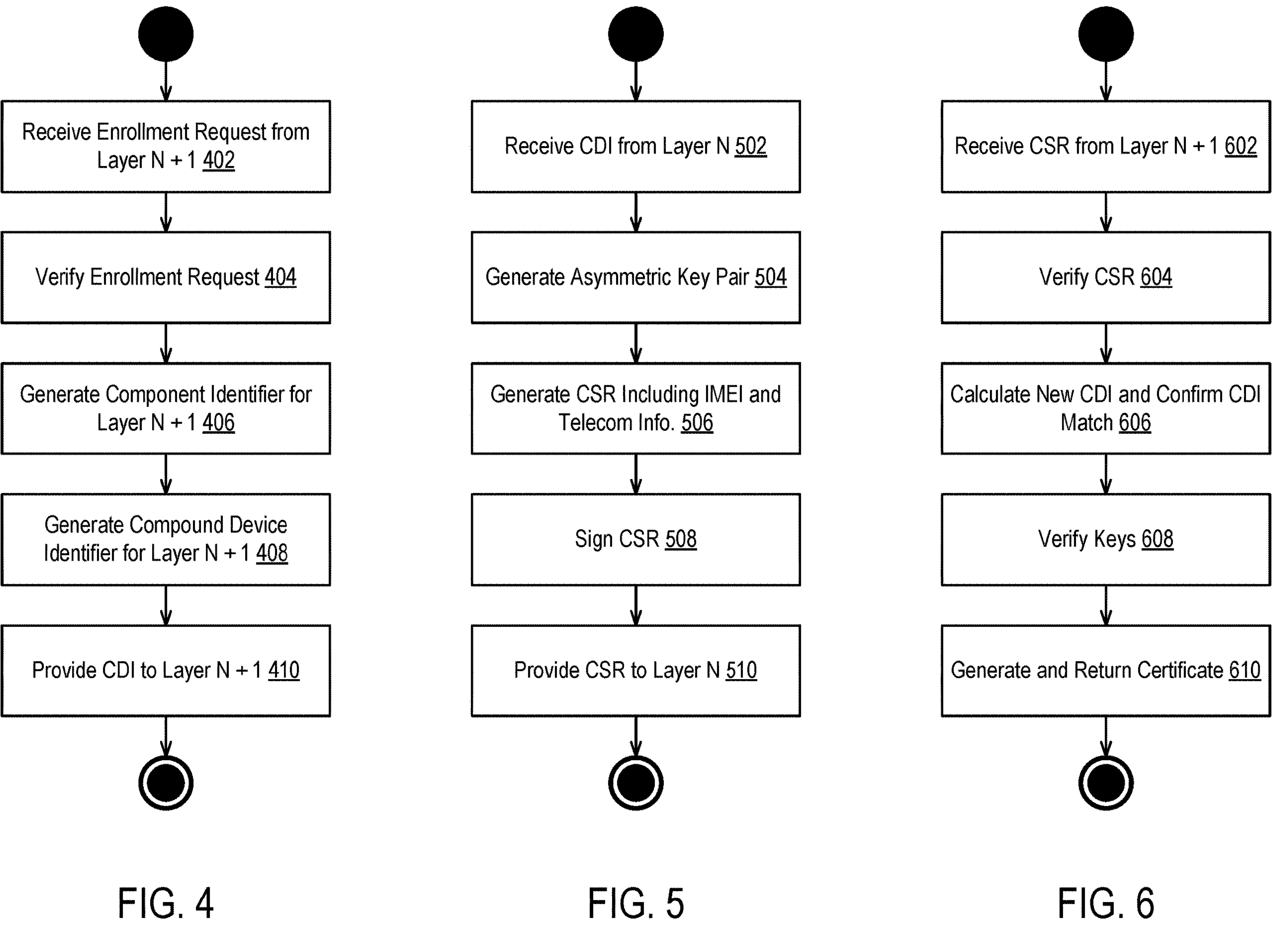
FIG. 4 is a flow diagram illustrating a method for generating a compound device identifier for a higher layer according to some embodiments of the disclosure.
FIG. 5 is a flow diagram illustrating a method for generating a CSR including a virtual IMEI according to some embodiments of the disclosure.
FIG. 6 is a flow diagram illustrating a method for generating a virtual IMEI certificate according to some embodiments of the disclosure.

FIG. 4 is a flow diagram illustrating a method for generating a compound device identifier for a higher layer according to some embodiments of the disclosure.

In this embodiment, the ECA (e.g., implemented in DICE Layer 0) may receive a certificate enrollment request from a higher layer (block 402) such as a Layer 1 or greater. The ECA will verify the enrollment request originates from the component named in the CSR Subject (block 404). For example, an enrollment request may be accompanied by a layer attestation that proves layering semantics to the ECA or the enrollment request may arrive over a trusted communication path.

In one embodiment, in response to the enrollment request the ECA layer first measures the next layer (N+1) to generate a component identifier ($TCI_{N+1}$) for the next layer (block 406). Next, the ECA layer uses the component identifier to compute a CDI value ($CDI_{N+1}$) for the next layer (block 408) and provides the CDI value to the next layer (N+1) (block 410).

FIG. 5 is a flow diagram illustrating a method for generating a CSR including a virtual IMEI according to some embodiments of the disclosure. In response to receiving a CDI value in block 502 (from block 410), the layer requesting a certificate (N+1) uses the $CDI_{N+1}$ value to generate its own asymmetric key pair ($PK_{N+1}$, $K_{N+1}$) (block 504). Next, the N+1 layer generates a CSR (block 506). In one embodiment, the CSR includes the generated public key ($PK_{N+1}$), the component identifier ($TCI_{N+1}$) as measured by the layer itself, and the IMEI. Note that in this embodiment, the IMEI may be obtained by a higher layer (e.g., a layer after Layer 0). In one embodiment, the component identifier ($TCI_{N+1}$) comprises a hash of MNO-defined data. As one example, the MNO-defined data may comprise one or more of an IMEI number or profile, an MNO name (e.g., "T-Mobile" or "Verizon"), a current timestamp value, and a TCI level (e.g., L1 if executed by Layer 1 code).

The CSR may also include various other fields (country, state, locality, organization, organizational unit, etc.). Finally, the layer generating the CSR signs the CSR (block 508) using its private key ($K_{N+1}$). The higher layer (N+1) then transmits the CSR to the lower layer (N) (block 510) to receive a certificate.

FIG. 6 is a flow diagram illustrating a method for generating a virtual IMEI certificate according to some embodiments of the disclosure.

In response to receiving the CSR (block 602), the ECA layer verifies the values received from layer N+1 (block 604) by verifying that the signature was created by the layer N+1 private key ($K_{N+1}$) using the CSR public key ($PK_{N+1}$) included in the request. The ECA layer then uses the original $TCI_{N+1}$ and $CDI_{N+1}$ values, or rederives them, to form a new CDI ($CDI_{new}$) (block 606). The ECA layer extracts the supplied $TCI_{N+1}$ value from the certificate and verifies that it matches the original value. The ECA layer then ensures the $CDI_{new}$ is the same as $CDI_{N+1}$ (block 606). The ECA layer regenerates the next layer's key pair ($PK_{new}$, $K_{new}$). The ECA layer then verifies that the public key in the CSR is the same as the regenerated key ($PK_{new}$) and delete the generated private key $K_{new}$ (block 608). Finally, the ECA layer issues the certificate using a CSR template (block 610). In some embodiments, the ECA layer signs the certificate with its private key.

In yet another embodiment, an external or third-party CA may be used to perform the above CSR verification functionality. In this embodiment, the external CA will store suitable data to perform the operations above.

An example of the certificate subject line is provided below:

Subject: C=US, ST=ID, L=Boise, O=Mfgr, OU=Memory Devices, CN=IMEI

To indicate different MNO, the organization (O) or organization Unit (OU) field can be assigned as the MNO name. For example:

Subject: C=US, ST=ID, L=Boise, O=CeliCo, OU= CellCoDept1, CN=IMEI

This bound the IMEI generated by the MNO ("CellCo") with this device. When the user, such as a smart meter, is using it, this is the identity of the device. Each time the smart meter is trying to connect to MNO, a new IMEI (profile) will be assigned by the MNO and the new layer 1 cert keys will be calculated using the methods described in connection with FIG. 3.

In the foregoing embodiments, although Elliptic Curve Digital Signature Algorithm (ECDSA) is primarily illustrated, the disclosed embodiments may utilize other suitable algorithms, such as Digital Signature Algorithm (DSA), Rivest—Shamir—Adleman (RSA) and Edwards-curve Digital Signature Algorithm (EdDSA), etc.

In this way, the IMEI number (or profile) is bound to the device using the secure Layer 0 certificate generation process. Any access later in the name of this IMEI should be granted to the device and the owner of this device can be billed. Thus, Layer 1 (e.g., N+1) keys are certified by Layer 0 (e.g., N) and Layer 0 (or N) is certificated by the manufacturer (via a manufacturer-generated root certificate or third-party root certificate).

In the illustrated embodiment, with different MNOs and/or different IMEI numbers (or profiles), the corresponding Layer 1 key pairs are different due to the certificate being generated by secure Layer 0 firmware using provided MNO/IMEI data. Therefore, automatically over-the-air (OTA) programming the device to for different MNOs and/or different IMEIs without a contract is more efficient.

In the illustrated embodiment, the device acts as an eSIM/eUICC card without requiring additional hardware to support this functionality. That is, the disclosed embodiments do not require a physical SIM/eSIM/eUICC as the device itself will act as the eSIM/eUICC and can provide not only the virtual IMEI, but also profile storage. Since the device implements a DICE protocol and uses a higher layer (e.g., Layer 1 or above) to bind the IMEI (or profile) with the device, the device can be easily be programmed OTA by any MNO without a physical SIM card. That is, Layer 1 provides IMEI (or profile) functionality and can be updated with a different IMEI (or profile).

Further, since the Layer 0 RoT is secured via DICE attestation, the ECA functionality can be guaranteed to be secure and the Layer 1 or greater certificates can be traced back to a secure cryptographic base.

Figure 7:
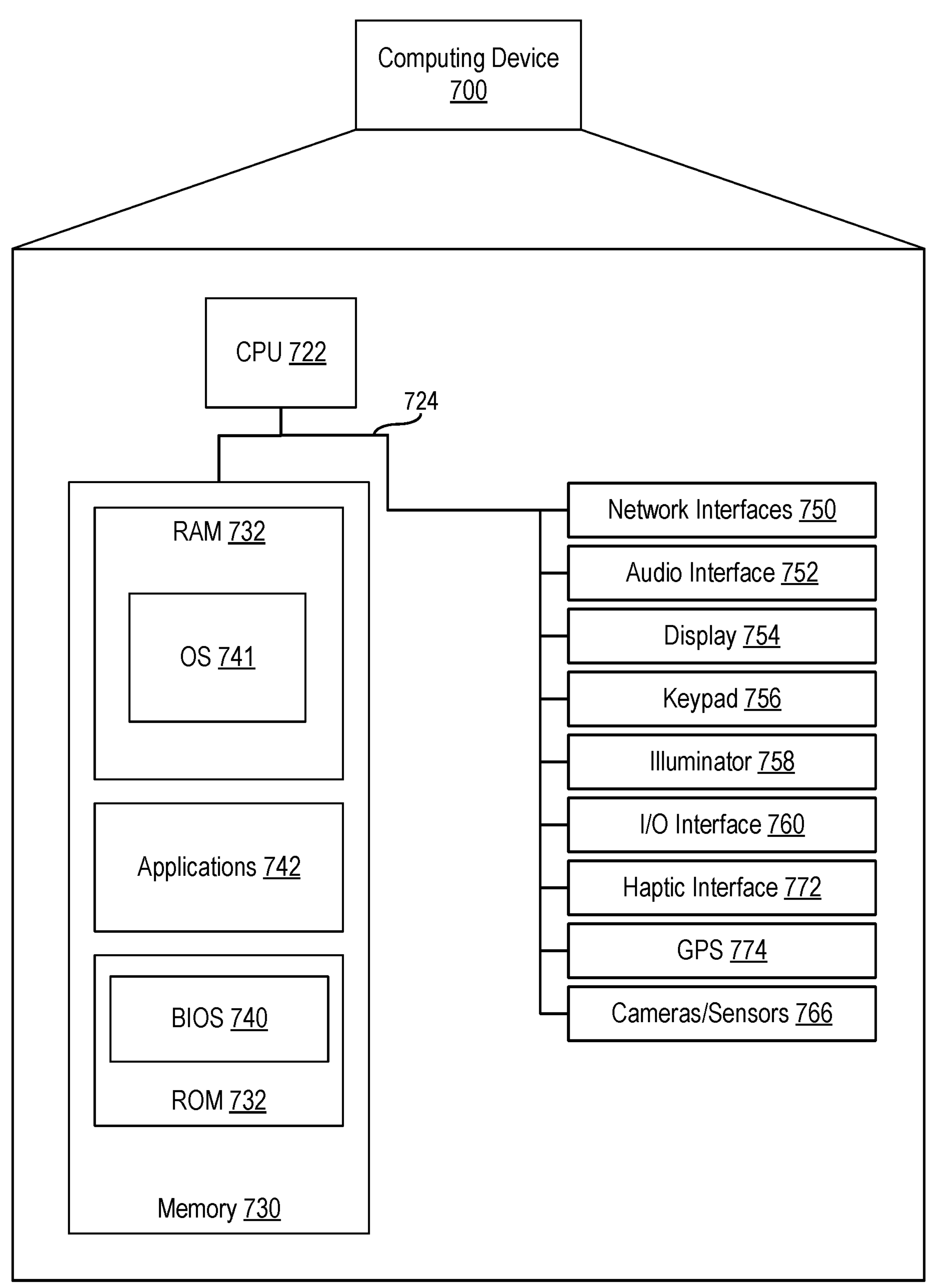
FIG. 7 is a block diagram illustrating a computing device showing an example of a client or server device used in the various embodiments of the disclosure.

FIG. 7 is a block diagram illustrating a computing device showing an example of a client or server device used in the various embodiments of the disclosure.

The computing device (700) may include more or fewer components than those shown in FIG. 7, depending on the deployment or usage of the device (700). For example, a server computing device, such as a rack-mounted server, may not include an audio interface (752), display (754), keypad (756), illuminator (758), haptic interface (772), Global Positioning Service (GPS) receiver (774), or cameras/sensor (766). Some devices may include additional components not shown, such as graphics processing unit (GPU) devices, cryptographic co-processors, artificial intelligence (AI) accelerators, or other peripheral devices.

As shown in the figure, the device (700) includes a central processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (772), an optional global positioning systems (GPS) receiver (774) and a camera(s) or other optical, thermal, or electromagnetic sensors (766). Device (700) can include one camera/sensor (766) or a plurality of cameras/sensors (766). The positioning of the camera(s)/sensor(s) (766) on the device (700) can change per device (700) model, per device (700) capabilities, and the like, or some combination thereof.

In some embodiments, the CPU (722) may comprise a general-purpose CPU. The CPU (722) may comprise a single-core or multiple-core CPU. The CPU (722) may comprise a system-on-a-chip (SoC) or a similar embedded system. In some embodiments, a GPU may be used in place of, or in combination with, a CPU (722). Mass memory (730) may comprise a dynamic random-access memory (DRAM) device, a static random-access memory device (SRAM), or a Flash (e.g., NAND Flash) memory device. In some embodiments, mass memory (730) may comprise a combination of such memory types. In one embodiment, the bus (724) may comprise a Peripheral Component Interconnect Express (PCIe) bus. In some embodiments, the bus (724) may comprise multiple busses instead of a single bus.

Mass memory (730) illustrates another example of computer storage media for the storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700).

Applications (742) may include computer-executable instructions which, when executed by the computing device (700), perform any of the methods (or portions of the methods) described previously in the description of the preceding Figures. In some embodiments, the software or programs implementing the method embodiments can be read from a hard disk drive (not illustrated) and temporarily stored in RAM (732) by CPU (722). CPU (722) may then read the software or data from RAM (732), process them, and store them to RAM (732) again.

The computing device (700) may optionally communicate with a base station (not shown) or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises an input/output interface (760) for communicating with external devices, using communication technologies, such as USB, infrared, Bluetooth™, or the like. The haptic interface (772) provides tactile feedback to a user of the client device.

The optional GPS receiver (774) can determine the physical coordinates of the computing device (700) on the surface of the Earth, which typically outputs a location as latitude and longitude values. GPS receiver (774) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

APPENDIX 1

```
Certificate Request:
Data:
  Version: 1 (0×0)
  Subject: C=US, ST=CA, L=Curpertino, 0=Manufacturer, OU=Memory, CN32 9ABEF838914800-B0654107C76EB7FF4F,
    emailAddress=admin@example.com
  Subject Public Key Info:
  Public Key Algorithm: id-ecPublicKey
    Public-Key: (256 bit)
    pub:
      04:00:dd:bf:67:65:69:93:d6:64:05:46:fb:b3:29:
      d5:37:c4:f4:7b:78:95:4e:b3:b7:cc:f0:86:65:a8:
      9b:f5:b4:d9:1a:a3:af:9b:86:8b:78:fa:84:dd:f5:
      1d:7b:23:e7:78:c6:4b:1f:68:cb:e9:76:a4:58:6f:
      14:cd:0a:90:e6
    ASN1 OID: prime256v1
    NIST CURVE: P-256
  Attributes:
  challengePassword: 1234
Signature Algorithm: ecdsa-with-SHA256
  30:44:02:20:2b:e6:a7:70:cc:e8:68:f4:90:ce:ab:a4:36:
    9b:
  94:c0:00:44:df:55:b2:d8:d1:d8:65:5e:cd:74:14:f2:6c:
    8f:
  02:20:25:6b:b7:e9:7a:57:d9:80:79:25:be:80:9c:ed:ab:
    c6:
  5e:4c:1c:94:f6:c6:ab:f7:c8:45:57:91:93:fd:55:86
```

APPENDIX 2

```
Certificate:
Data:
  Version: 3 (0×2)
  Serial Number:
  a7:1b:2d:61:c1:ba:79:32:33:4a:8d:8a:7e:4d:1a:36:13:
    e4:6d
  Signature Algorithm: ecdsa-with-SHA256
  Issuer: C=US, ST=CA, L=San Francisco, O=Manufacturer
Issuing CA
Validity
Not Before: February 1 18:55:39 2021 GMT
Not After: February 2 06:35:39 2021 GMT
Subject: C=US, ST=ID, L=Boise, O=Manufacturer,
  OU=Memory,
  CN=9ABEF838914800B0654107C76EB7FF4F
Subject Public Key Info:
  Public Key Algorithm: id-ecPublicKey
  Public-Key: (256 bit)
  pub:
```

04:f9:59:a1:24:45:a2:70:b5:93:69:00:53:0a:ff:
5e:97:6c:19:20:6a:1e:73:15:4c:d8:17:ab:d8:80:
7c:38:86:49:8d:54:95:8d:c0:29:90:68:63:3c:59:
2e:f3:34:61:f0:a4:a1:c7:f4:fd:cd:11:ad:1e:91:
ee:d1:32:6b:3f
ASN1 OID: prime256v1
NIST CURVE: P-256
X509v3 extensions:
X509v3 Basic Constraints: critical
CA: FALSE
X509v3 Key Usage: critical
Digital Signature
X509v3 Authority Key Identifier:
keyid:21:D2:86:3B:EA:56:D0:B2:2F:D0:53:A8:BA:8A:
B0:06:54:07:00:F0
X509v3 Certificate Policies:
Policy: Policy Qualifier CPS
CPS: Client Authentication
X509v3 Subject Key Identifier:
D6:6D:B9:91:51:37:57:7D:B9:D5:74:7B:37:9D:CA:36:
62:BA:06:3B
Signature Algorithm: ecdsa-with-SHA256
30:45:02:20:40:a6:3b:bf:82:cd:f9:f5:74:14:9f:13:e0:
6c:
0e:1f:87:75:f2:cc:29:8d:24:fc:db:1c:d2:4d:c0:63:10:
04:
02:21:00:cb:b9:3e:39:08:82:19:a7:79:3e:ba:79:32:80:
08:29:
b5:8f:59:85:a4:29:88:8e:a4:38:e9:7b:1b:18:68:11

The invention claimed is:

1. A method comprising:

receiving, at a mobile device, an International Mobile Equipment Identity (IMEI) number from a cellular network;

generating, by a Device Identity Composition Engine (DICE) of the mobile device, a digital certificate using the IMEI number, the digital certificate signed using a private key generated by a manufacturer of the mobile device;

transmitting, by the mobile device, the digital certificate to the cellular network when authenticating to the cellular network; and receiving a second IMEI number from the cellular network and generating a second digital certificate using the second IMEI number, the second digital certificate signed using the private key.

2. The method of claim 1, further comprising executing a Layer 0 firmware code, the Layer 0 firmware code storing the private key.

3. The method of claim 2, wherein the Layer 0 firmware code generates the digital certificate in response to a certificate signing request (CSR) transmitted by a Layer 1 code.

4. The method of claim 3, wherein the Layer 1 code includes the IMEI number in the CSR.

5. The method of claim 4, wherein the Layer 1 code includes one or more of a mobile network operator name and a timestamp.

6. The method of claim 1, wherein the certificate includes the IMEI number.

7. A non-transitory computer-readable storage medium for tangibly storing computer program instructions capable of being executed by a computer processor, the computer program instructions defining the steps of:

receiving, at a mobile device, an International Mobile Equipment Identity (IMEI) number from a cellular network;

generating, by a Device Identity Composition Engine (DICE) of the mobile device, a digital certificate using the IMEI number, the digital certificate signed using a private key generated by a manufacturer of the mobile device;

transmitting, by the mobile device, the digital certificate to the cellular network when authenticating to the cellular network; and receiving a second IMEI number from the cellular network and generating a second digital certificate using the second IMEI number, the second digital certificate signed using the private key.

8. The non-transitory computer-readable storage medium of claim 7, further comprising executing a Layer 0 firmware code, the Layer 0 firmware code storing the private key.

9. The non-transitory computer-readable storage medium of claim 8, wherein the Layer 0 firmware code generates the digital certificate in response to a certificate signing request (CSR) transmitted by a Layer 1 code.

10. The non-transitory computer-readable storage medium of claim 9, wherein the Layer 1 code includes the IMEI number in the CSR.

11. The non-transitory computer-readable storage medium of claim 10, wherein the Layer 1 code includes one or more of a mobile network operator name and a timestamp.

12. The non-transitory computer-readable storage medium of claim 7, wherein the certificate includes the IMEI number.

13. A device comprising:

a processor; and a storage medium for tangibly storing thereon program logic causing the processor to perform operations of:

receiving an International Mobile Equipment Identity (IMEI) number from a cellular network, the cellular network comprising a core network and a radio access network (RAN);

generating, by a Device Identity Composition Engine (DICE), a digital certificate using the IMEI number, the digital certificate signed using a private key generated by a manufacturer of the device;

transmitting the digital certificate to the cellular network via the RAN when authenticating to the cellular network; and receiving a second IMEI number from the cellular network and generating a second digital certificate using the second IMEI number, the second digital certificate signed using the private key.

14. The device of claim 13, the operations further comprising executing a Layer 0 firmware code, the Layer 0 firmware code storing the private key.

15. The device of claim 14, wherein the Layer 0 firmware code generates the digital certificate in response to a certificate signing request (CSR) transmitted by a Layer 1 code.

16. The device of claim 15, wherein the Layer 1 code includes the IMEI number in the CSR.

17. The device of claim 16, wherein the Layer 1 code includes one or more of a mobile network operator name and a timestamp.

* * * * *